(12) United States Patent
Tucak et al.

(10) Patent No.: US 11,261,907 B2
(45) Date of Patent: Mar. 1, 2022

(54) BEARING CLOSURE DEVICE AND METHOD FOR OPERATING THE SAME

(71) Applicant: SMS group GmbH, Düsseldorf (DE)

(72) Inventors: Andrej Tucak, Wenden-Brün (DE); Daniel Knie, Freudenberg (DE); Roland Will, Wenden (DE)

(73) Assignee: SMS group GmbH, Düsseldorf (DE)

( * ) Notice: Subject to any disclaimer, the term of this patent is extended or adjusted under 35 U.S.C. 154(b) by 191 days.

(21) Appl. No.: 16/618,341

(22) PCT Filed: May 28, 2018

(86) PCT No.: PCT/EP2018/063895
§ 371 (c)(1),
(2) Date: Nov. 30, 2019

(87) PCT Pub. No.: WO2018/219850
PCT Pub. Date: Dec. 6, 2018

(65) Prior Publication Data
US 2021/0140470 A1    May 13, 2021

(30) Foreign Application Priority Data

Jun. 1, 2017   (DE) ..................... 10 2017 209 304.8
Oct. 4, 2017   (DE) ..................... 10 2017 217 562.1

(51) Int. Cl.
| B23P 19/02 | (2006.01) |
| B25B 27/06 | (2006.01) |
| B25B 27/02 | (2006.01) |
| F16C 13/02 | (2006.01) |
| B23P 15/00 | (2006.01) |

(Continued)

(52) U.S. Cl.
CPC ............ *F16C 13/02* (2013.01); *B23P 15/003* (2013.01); *B23P 19/02* (2013.01); *B25B 27/062* (2013.01);
(Continued)

(58) Field of Classification Search
CPC .... B23P 19/02; F16C 2229/00; B25B 27/062; B25B 27/02; B25B 27/023; B25B 27/06
See application file for complete search history.

(56) References Cited

U.S. PATENT DOCUMENTS

| 3,080,199 A | 3/1963 | Rickley |
| 3,966,282 A | 6/1976 | Overton |

(Continued)

FOREIGN PATENT DOCUMENTS

| CN | 104438990 A | 3/2015 |
| CN | 204448832 U | 7/2015 |

(Continued)

*Primary Examiner* — Christopher J Besler
(74) *Attorney, Agent, or Firm* — Smartpat PLC

(57) ABSTRACT

A bearing closure device has a externally threaded ring that can be slid onto a roll journal. One stop close to the roll barrel and one stop away from the roll barrel are provided on the roll journal in order to limit the axial movement of the threaded ring. A ring nut with an internal thread is screwed onto the external thread of the threaded ring. To facilitate safe screwing on and unscrewing of the ring nut and to keep screws pressure-free during the operation of the bearing a pressure ring is mounted between the bearing and the threaded ring in an axially displaceable manner. In addition, a plurality of screws can be screwed into axial threaded bores in the threaded ring in order to press against the pressure ring in the axial direction. Finally, the ring nut can be screwed or adjusted against the pressure ring.

14 Claims, 19 Drawing Sheets

(51) Int. Cl.
*F16C 35/06* (2006.01)
*F16C 35/04* (2006.01)
*B21B 31/07* (2006.01)
*B21B 31/18* (2006.01)

(52) U.S. Cl.
CPC .............. *F16C 35/04* (2013.01); *F16C 35/06* (2013.01); *B21B 31/07* (2013.01); *B21B 31/18* (2013.01); *B25B 27/02* (2013.01); *F16C 2226/60* (2013.01); *F16C 2322/12* (2013.01)

(56) References Cited

U.S. PATENT DOCUMENTS

| | | | |
|---|---|---|---|
| 4,938,615 A | 7/1990 | Baker | |
| 6,132,101 A * | 10/2000 | Landy, III | B21B 31/07 384/559 |
| 8,690,743 B2 | 4/2014 | Keller | |
| 2010/0000375 A1 | 1/2010 | Steinbock et al. | |

FOREIGN PATENT DOCUMENTS

| | | |
|---|---|---|
| CN | 204610423 U | 9/2015 |
| CN | 204710856 U | 10/2015 |
| DE | 1254108 B | 11/1967 |
| DE | 69010141 | 11/1994 |
| EP | 2143521 A1 | 1/2010 |
| FR | 1254487 A | 2/1961 |
| GB | 2060820 A | 5/1981 |
| JP | 6069825 U | 5/1985 |
| JP | H1015610 A | 1/1998 |
| JP | 2001065583 A | 3/2001 |
| RU | 2048220 C1 | 11/1995 |
| SU | 820944 A1 | 4/1981 |

* cited by examiner

BEARING CLOSURE DEVICE AND METHOD FOR OPERATING THE SAME

TECHNICAL FIELD

The disclosure relates to a closure device for a bearing on a roll journal of a roller for rolling, in particular, metallic rolling stock. With the assistance of the bearing, the roller is rotatably mounted in a roll stand. In addition, the disclosure relates to a method for operating the bearing closure device to, on the one hand, draw the bearing on the roll journal and, on the other hand, drawn off the bearing from the roll journal.

BACKGROUND

Bearing closure devices are generally known in the prior art. An example of a well-known bearing closure device is shown in FIG. 19. It is known under the name "QC-Quick Change." This known bearing closure device 100 is used to fasten at least one bearing 200 to a roll journal 310 of a roller, wherein the bearing 200 is formed to hold the roller in a roll stand. The bearing closure device 100 has a threaded ring 110 that can be slid onto a roll shoulder 320 of the roll journal 310. A first section 111 of the threaded ring 110 has an external thread 112. At the end of the roll shoulder 320 remote from the roll barrel 330, a stop in the form of a hinged ring 120' or a bayonet lock 120" is arranged in order to limit the axial movement of the threaded ring 110. Furthermore, the known bearing closure device 100 includes a ring nut 130 with an internal thread 132 for screwing onto the external thread 112 of the threaded ring 110.

The bearing 200 is traditionally drawn on the roll journal with the assistance of a crane, which first pre-positions the bearing together with the bearing closure device 100 on the roll journal or journal shoulder. After such pre-positioning, the hinged ring 120' is closed in a groove in the roll shoulder, or the bayonet lock 120" is locked on the roll shoulder; i.e., the stop is fitted. The ring nut 130 is then tightened with the assistance of a crane rope. Thereby, the ring nut 130 is displaced axially in the direction of the bearing 200 as shown in FIG. 19, by which the bearing 200 is displaced further to the left in the direction of the roll barrel 330 on the roll journal 310. Due to the coupling of the ring nut 130 with the threaded ring 110 via the common thread 112, 132, when turning the ring nut 130, the threaded ring 110 in FIG. 19 is displaced simultaneously to the right and supports itself against the stop, for example the hinged ring 120', wherein the hinged ring on its part supports itself in the groove of the roller or the roll shoulder 320.

The bearing 200 is traditionally drawn off from the roll journal as follows: Initially, the ring nut 130 is unscrewed by means of the crane rope; in FIG. 19, the nut moves to the right until it is supported by its outer collar or flange on the intermediate ring 150. During such support, due to the coupling via the thread 112, 132, the threaded ring 110 moves to the left when the ring nut 130 is turned further until the threaded ring 110 hits the roll journal 310 at the stop 315. Thereby the stop or hinged ring 120' is free of any pre-load and can be opened or removed. When the hinged ring is removed, the path is clear for the axial drawing off of the bearing closure device 100 together with the bearing 200 from the roll journal by means of the crane.

A disadvantage of such known prior art is the necessity that the ring nut 130 must either be tightened or loosened with the assistance of a crane rope. Such approach is dangerous for an operator and inaccurate with regard to the desired exact positioning of the bearing on the roll journal.

In addition, with regard to the prior art, reference is also made to the European patent application EP 2 143 521 A1, which discloses a flange connection with the assistance of screw bolts. Peripherally to a main bolt, which connects the two flanges there, a plurality of smaller screws serving to build up a pre-load of a predetermined size is arranged. The bolts remain under the pre-load even during the operation or during the existence of the flange connection. This is disadvantageous.

SUMMARY

The invention is based on the object of making a known bearing closure device, along with known methods for drawing the bearing on a roll journal and for releasing the bearing from the roll journal safer with the assistance of the bearing closure device, in particular because the crane rope is no longer required, and of permanently relieving the load on the screws that are used.

This object is achieved by the bearing closure device as claimed. The bearing closure device includes a pressure ring between the bearing and the threaded ring, which pressure ring is likewise mounted in a displaceable manner in the axial direction and which at least partially overlaps in the radial direction with both the threaded ring and with the ring nut. In the threaded ring (distributed around its circumference), a plurality of screws are mounted rotatably in axial threaded bores for pressing against the pressure ring in the axial direction. The ring nut can be screwed and adjusted in the axial direction against the pressure ring.

The necessary force to draw the bearing on the roll journal is initially applied with the assistance of screws, which are tightened with a torque wrench or another suitable tool. This eliminates the need for the dangerous use of a crane rope for applying the necessary drawing force to the bearing. However, so that the screws do not have to be permanently under pressure during the operation of the bearing and the roller, as will be apparent later in the description, the ring nut is screwed against the pressure ring until it touches it. The pressure ring and thus also the bearing are fixed in their axial position by the ring nut. The screws are then turned back prior to operating the roll and are thus relieved of the axial compressive force.

The same applies to the process of releasing or drawing off the bearing from the roll journal. Here as well, the screws in the threaded ring are used only briefly to decouple the pressure ring and ring nut; only for this purpose are the screws in the threaded ring temporarily subjected to heavy axial loads; they are then screwed back again and thus relieved axially.

According to a first exemplary embodiment, the bearing closure device also includes a ring-shaped end cap for overlapping at least radially outer parts of the bearing—which do not rotate with the roller. In other words, the end cap is formed to engage with the bearing in such a manner that, when an axial force is applied to the end cap, the bearing is axially drawn out from the roll journal as well. The force is applied by screws which are directly or indirectly connected to the end cap and the ring nut in order to build up axial tension between the end cap and the ring nut for the axial drawing off of the bearing.

Various arrangements of the end cap and the ring nut are the subject matter of the dependent claims.

Furthermore, various exemplary embodiments for the stop remote from the roll barrel are the subject matter of the dependent claims. For example, this stop, which is remote from the roll barrel, can be formed as a hinged ring or a bayonet lock.

The pressure ring can be mounted in an axially displaceable manner at least in part, for example on an extension (2nd section) of the threaded ring in the direction of the bearing, on the roll journal or on a filling ring between the bearing and the threaded ring.

For the drawing off of the bearing from the roll journal, it is necessary that the threaded ring is limited in its axial movement to the roll barrel and can be supported by a stop close to the roll barrel. For example, this can be formed by a second ring-shaped section of the roll journal, i.e. the roll shoulder, with a diameter formed smaller than the first ring-shaped section of the roll journal. Alternatively, the stop close to the roll barrel for the threaded ring can also be formed by a type of feather key in the roll journal at the height of the threaded ring.

The bearing is drawn on the roll journal preferably with a predetermined axial force. In order to be able to control such drawing force it is optionally provided that the pressure ring has a pressure measuring cell to record the drawing force that is actually applied.

The aforementioned object of the invention is further achieved by a method for drawing the bearing on the roll journal and by a method for releasing and/or drawing off the bearing from the roll journal, in each case with the assistance of the disclosed bearing closure device. The advantages of such methods correspond to the advantages mentioned above with regard to the claimed bearing closure device.

DETAILED DESCRIPTION

The invention is described in detail below with reference to FIGS. 1 to 18 in the form of exemplary embodiments. In all figures, the same technical elements are designated with the same reference signs.

Figure 1:
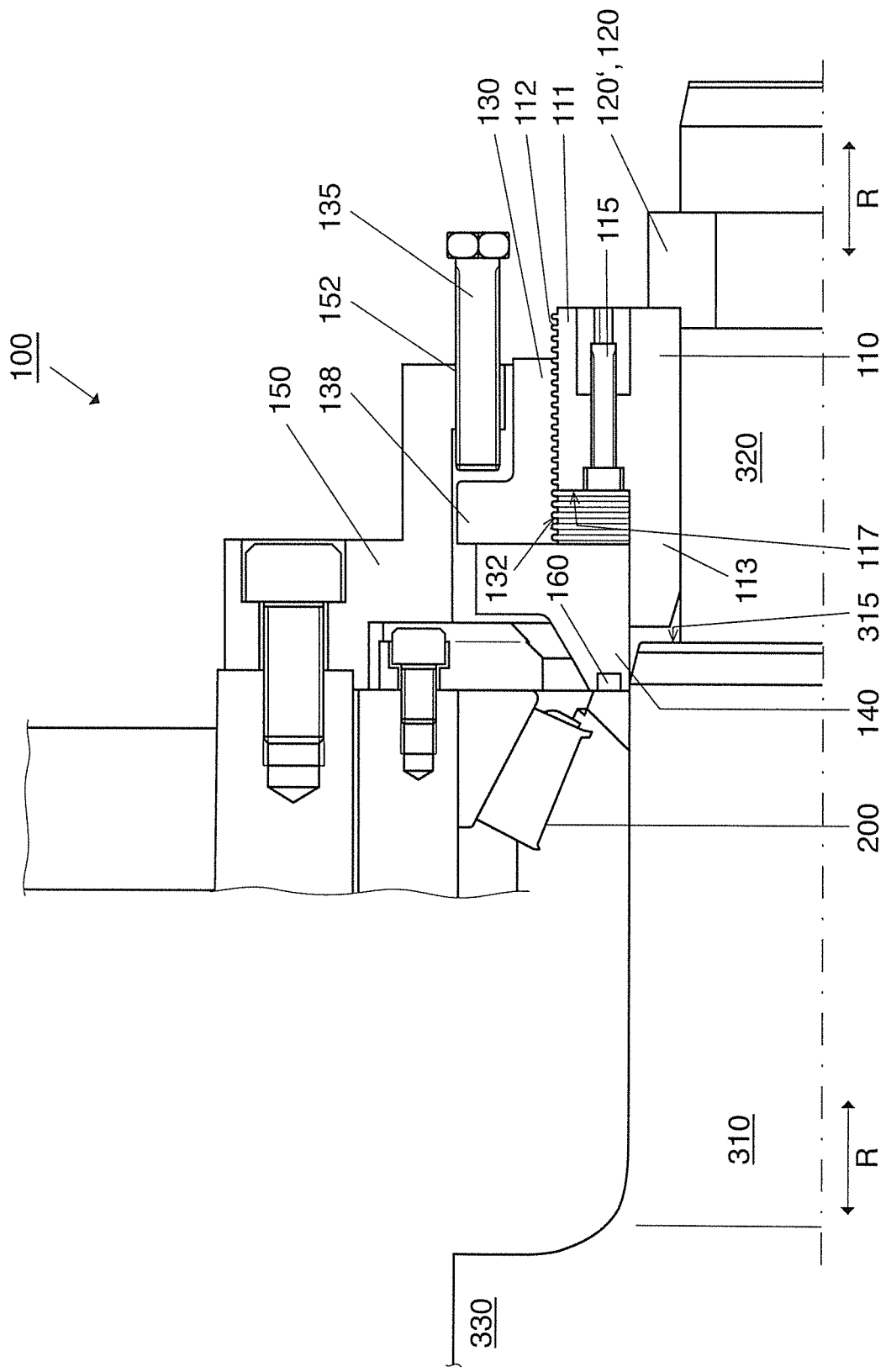
FIG. 1 shows a bearing closure device with a first exemplary embodiment of a stop remote from the roll barrel, for an end cap ring nut arrangement and for a roll journal threaded ring arrangement.

FIG. 1 shows the bearing closure device 100 in a first embodiment. It is used to draw at least one bearing 200 on a roll journal 310, to hold the bearing 200 on the roll journal or to release the bearing 200 from the roll journal 310 of a roller.

The bearing closure device 100 has a threaded ring 110, which can be slid axially onto a roll shoulder 320 of the roll journal 310. The threaded ring 110 has a first axially extending section 111, which carries an external thread 112 on its external side. In addition to the first ring-shaped section 111, the threaded ring 110 has a second ring-shaped section 113. Typically, the second ring-shaped section is formed with a smaller outer diameter than the first ring-shaped section 111, thereby forming a stop 117 in the transition area between the two sections 111, 113. The threaded ring 110 is installed in the bearing closure device in such a manner that the first section 111 is arranged further away from the roll barrel 330 of the roller than the second section 113.

Figure 2:
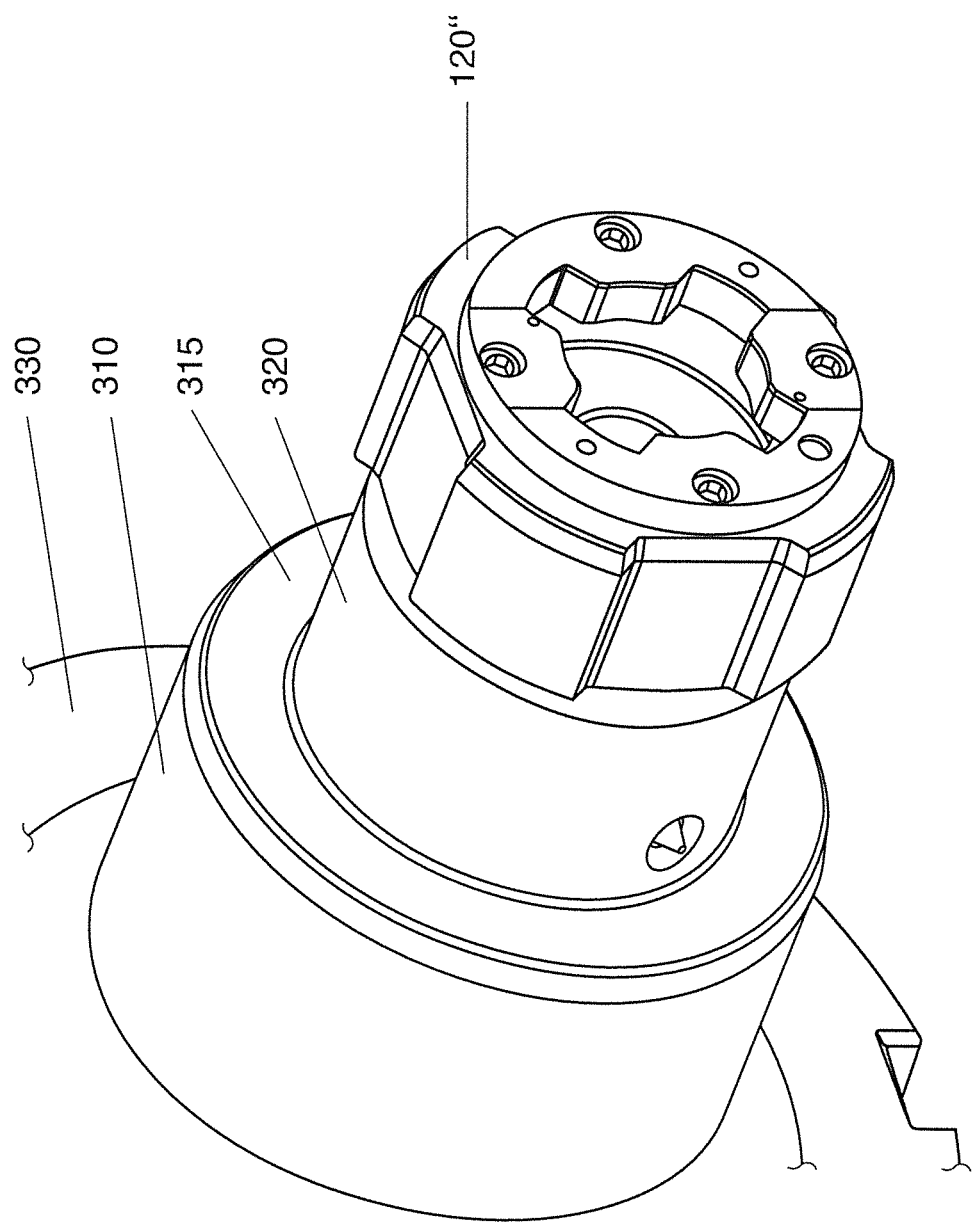
FIG. 2 shows a second exemplary embodiment of the stop remote from the roll barrel.

The bearing closure device 100 also has a stop 120 that can be attached to the end of the roll shoulder 320 remote from the roll barrel in order to limit the axial movement of the threaded ring 110, which is mounted on the roll shoulder 320 in an axially displaceable manner. The stop 120 can be either in the form of a hinged ring 120' or in the form of a bayonet lock 120", as shown in FIG. 2.

The bearing closure device 100 also has a ring nut 130 with an internal thread 132 for screwing onto the external thread 112 of the threaded ring 110. With the exemplary embodiment shown in FIG. 1, the ring nut 130 has a flange 138 that extends in a radial outward manner. This flange 138 can be formed with or without axial bores; see also FIG. 14. Alternatively, the ring nut can also be formed completely without an outer flange; see FIG. 15.

As shown in FIG. 1, the bearing closure device 100 has a pressure ring 140 that is mounted on the second ring-shaped section 113 of the threaded ring 110 in a displaceable manner in the axial direction R. In the first section 111 of the threaded ring 110 (distributed around its circumference), a plurality of screws 115 are rotatably mounted in axial threaded bores for pressing against the pressure ring 140 in the axial direction R.

Furthermore, the bearing closure device 100 has a ring-shaped intermediate ring 150, which is formed in such a manner that it partially overlaps or engages at least the radially outer parts of the bearing 200 that do not rotate with the roller. This means that the bearing is displaced onto the roll journal by the intermediate ring or pressure ring or released or drawn off from the roll journal. The intermediate ring 150 and the bearing 200 thus form one unit.

In addition to the first screws 115 in the threaded ring 110, second screws 135 are provided, which are directly or indirectly connected to the intermediate ring 150 and the ring nut 130 in order to build up an axial force between the intermediate ring 150 and the ring nut 130 for the axial drawing off of the bearing 200.

In this specification, a total of 3 different variants are distinguished for the arrangement of the intermediate ring 150 and the ring nut 130 for effective interaction.

FIG. 1 shows a first variant. As already mentioned, the ring nut 130 for such first variant has the flange 138 that projects radially outwardly. The ring-shaped intermediate ring 150 has an axially and radially extending inner flange 152 in its radial inner area. Such flange is formed to overlap the outer flange 138 of the ring nut 130 in such a manner that the end face of the flange 138 of the ring nut 130 remote from the barrel is opposite the end face of the flange 152 of the intermediate ring close to the barrel. The second bolts 135 can be screwed into axial bores in the flange 152 of the extension ring, as shown in FIG. 1, in order to build up an axial force between the extension ring 150 and the ring nut 130, if the second bolts 135 are screwed against the flange 138 and are supported there.

Figure 14:
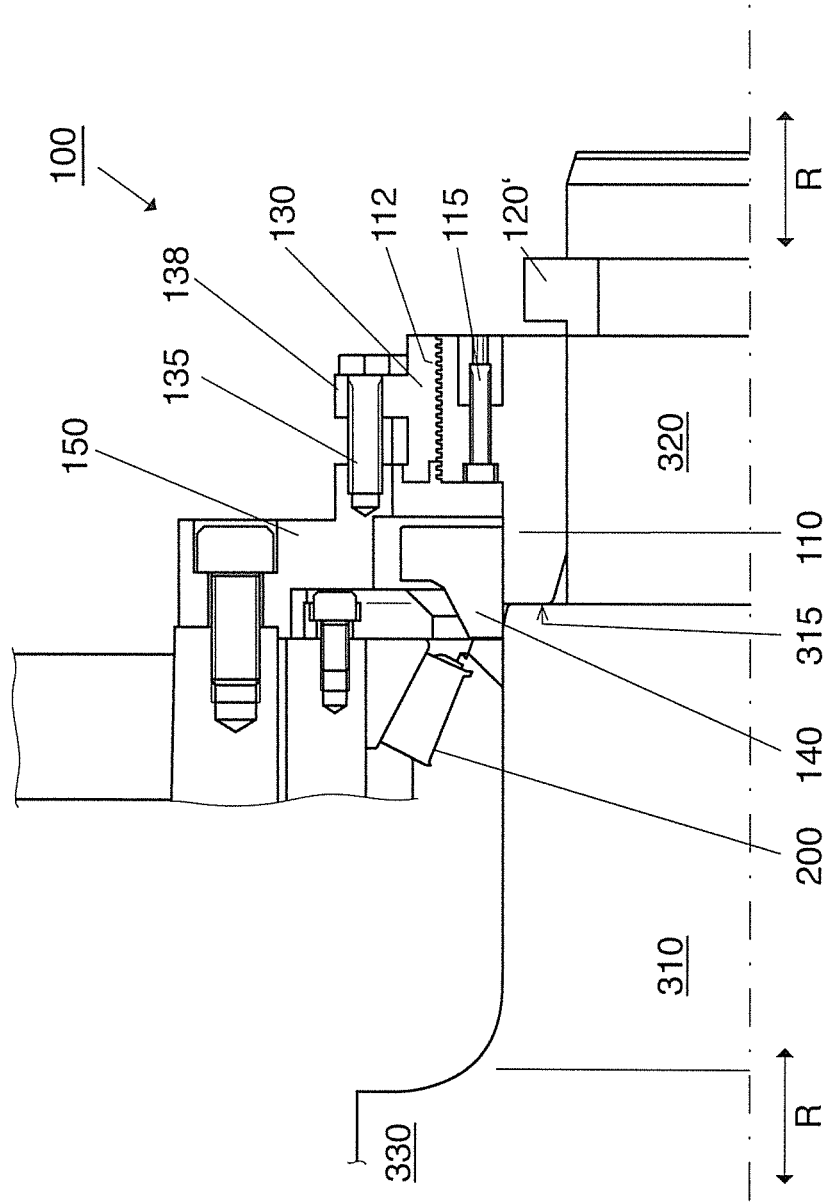
FIG. 14 shows a second exemplary embodiment of an end cap ring nut arrangement.

FIG. 14 shows a second variant for the arrangement of the intermediate ring 150 and the ring nut 130. In contrast to the first variant according to FIG. 1, the flange 138 of the ring nut 130 with the second variant has a plurality of axially aligned bores distributed around the circumference of the flange. The ring-shaped intermediate ring 150 now does not overlap the flange 138 of the ring nut but is located with its radial inner area opposite the end face of the outer flange 138 close to the barrel. In such radial internal area, the intermediate ring 150 has a plurality of axially aligned internally threaded bores distributed around its circumference, wherein the bores in the intermediate ring 150 are aligned with the bores in the flange 138 of the ring nut 130. The second bolts 135 can be passed through the bores in the flange 138 of the ring nut and screwed into the threaded bores in the intermediate ring 150 in order to build up the tensile stress between the intermediate ring and the ring nut. To release the bearing 200 from the roll journal, the second screws 135 are tightened, wherein the force builds up between the intermediate ring and the ring nut, because the screws are supported by the flange 138 with their screw heads. Due to the positive-locking connection between the intermediate ring 150 and the bearing 200, the bearing is then released or drawn off from the roll journal together with the intermediate ring or with the assistance of the intermediate ring; this applies to all three variants.

Figure 15:
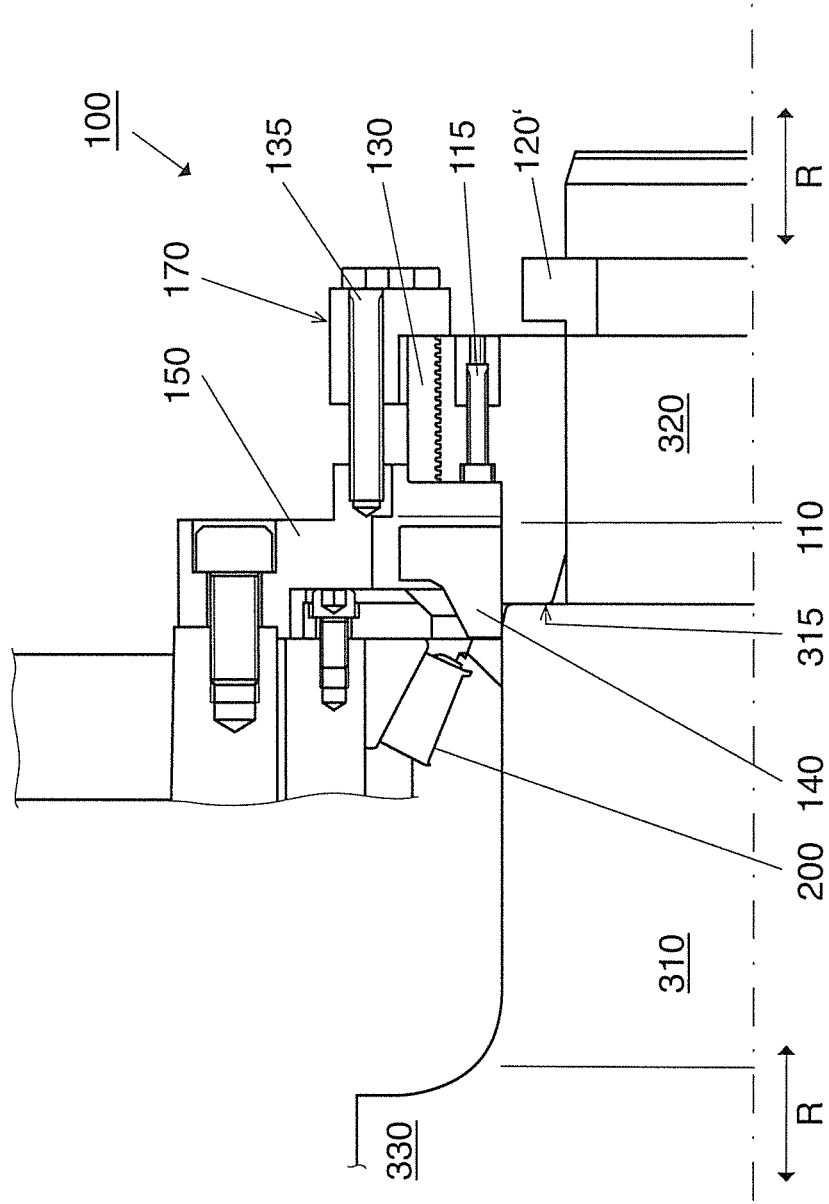
FIG. 15 shows a third exemplary embodiment of an end cap ring nut arrangement.

FIG. 15 shows the third variant. With such third variant, an additional ring 170 is provided for axial mounting on the end face of the ring nut 130 remote from the barrel. The additional ring 170 has a plurality of axially aligned bores distributed around its periphery, which bores are formed radially outside the ring nut. The ring-shaped intermediate ring 150 with its radial inner area is located opposite the end face of the periphery of the additional ring 170 close to the barrel. In its radial internal area, the intermediate ring has a plurality of axially aligned bores with internal threads distributed around its circumference, wherein such bores are aligned with the bores in the additional ring 170. With the third variant, the second screws 135 can be passed through the bores in the additional ring 170 and screwed into the bores in the intermediate ring 150 in order to build up the force between the intermediate ring of the ring nut and the additional ring 170 to release the bearing 200 from the roll journal 310, wherein the screws 135 are supported with their screw heads on the additional ring 170.

With reference again to FIG. 1, it can be seen here that, for example, the pressure ring 140 has a pressure measuring cell 160 for recording a drawing force actually applied by the first screws 115 when the bearing 200 is drawn on the roll journal.

Figure 3:
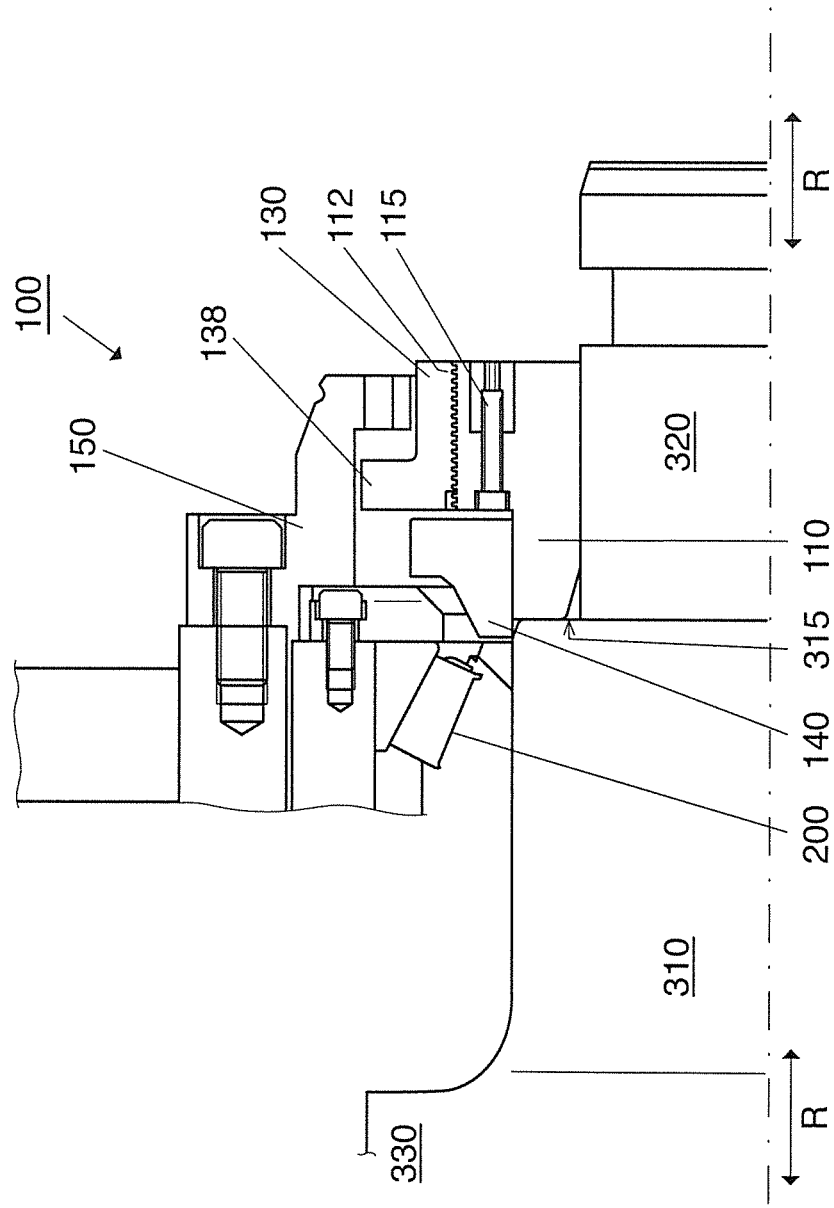
FIGS. 3-7 show the drawing of a bearing on a roll journal with the assistance of the bearing closure device.
Figure 4:
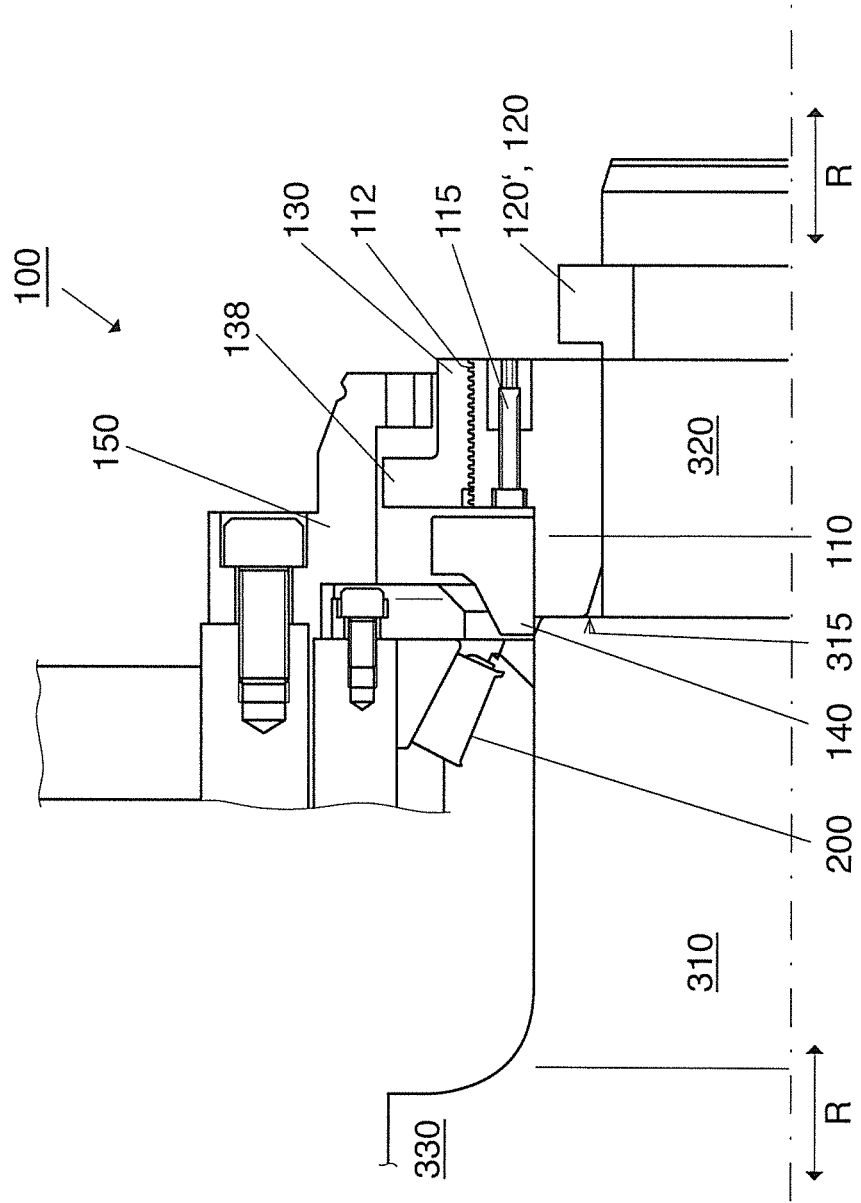
Figure 5:
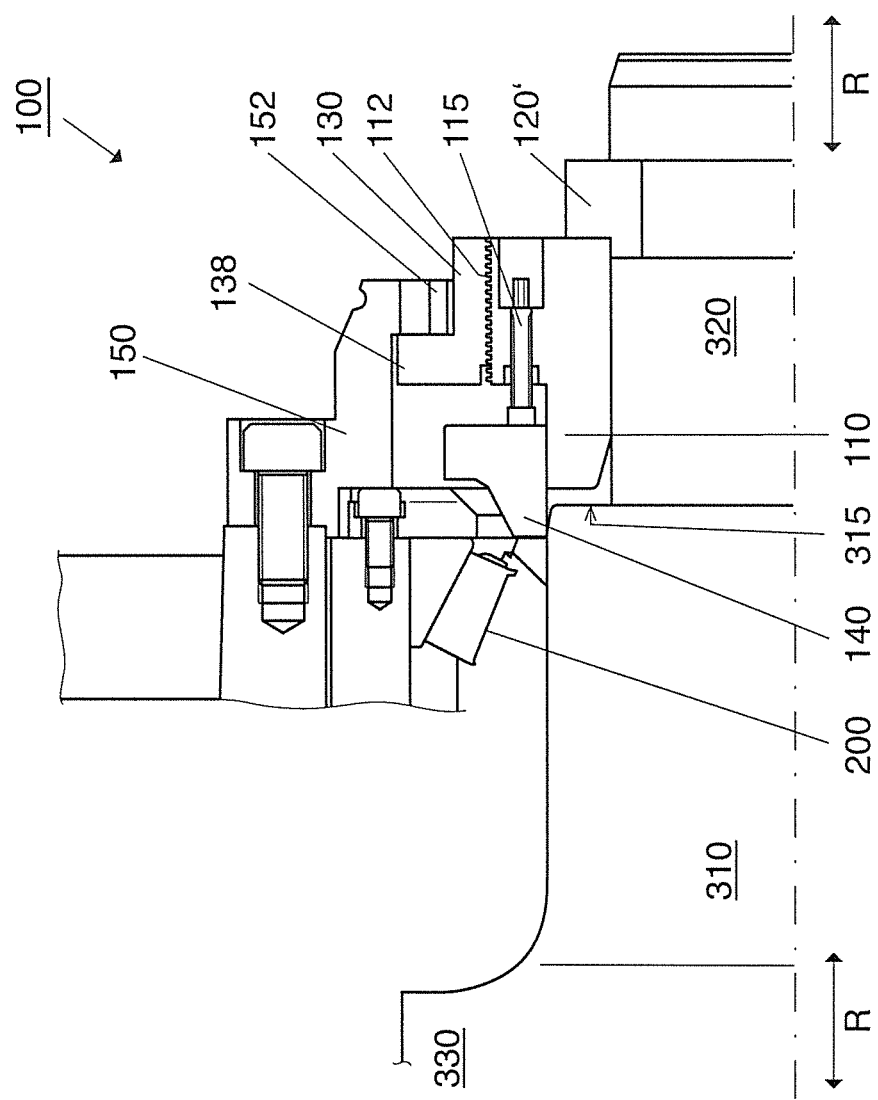

A method for drawing the bearing 200 on the roll journal 310 of a roller with the assistance of the bearing closure device 100 comprises the following steps:

Initially, the bearing is pre-positioned on the roll journal 310 in positive-locking connection with the bearing closure device 100. Thereby, the bearing 200 is positioned closer to the barrel on the roll journal than the bearing closure device 100; the latter is pre-positioned, as shown in FIG. 3, axially further out on the roll shoulder 320.

The pre-positioning of the bearing and the bearing closure device is typically carried out with a crane or a drawing-on machine. After pre-positioning, the stop 120 is axially fixed on the end of the roll shoulder 320 remote from the roll barrel according to FIG. 4. The stop 120, for example in the form of the hinged ring 120' or the bayonet lock 120", serves as a right-side travel limit for the axial movement of the threaded ring 110. The actual positioning of the bearing 200 on the roll journal 310 with a predetermined drawing force is carried out by axially displacing the pressure ring 140, by way of example in FIGS. 3 and 4 to the left against the bearing 200. This axial displacement of the pressure ring 140 and the bearing 200 is achieved by screwing the first screws 115 into the axial threaded bores in the first ring-shaped section 111 of the threaded ring 110 against the pressure ring 140. Thereby, the threaded ring 110 is supported by the axially fixed stop 120, 120'. The application of the specified predetermined drawing force is carried out by tightening the first screws 115 to a predetermined torque with the assistance of a torque wrench or another suitable tool; see FIG. 5.

Figure 6:
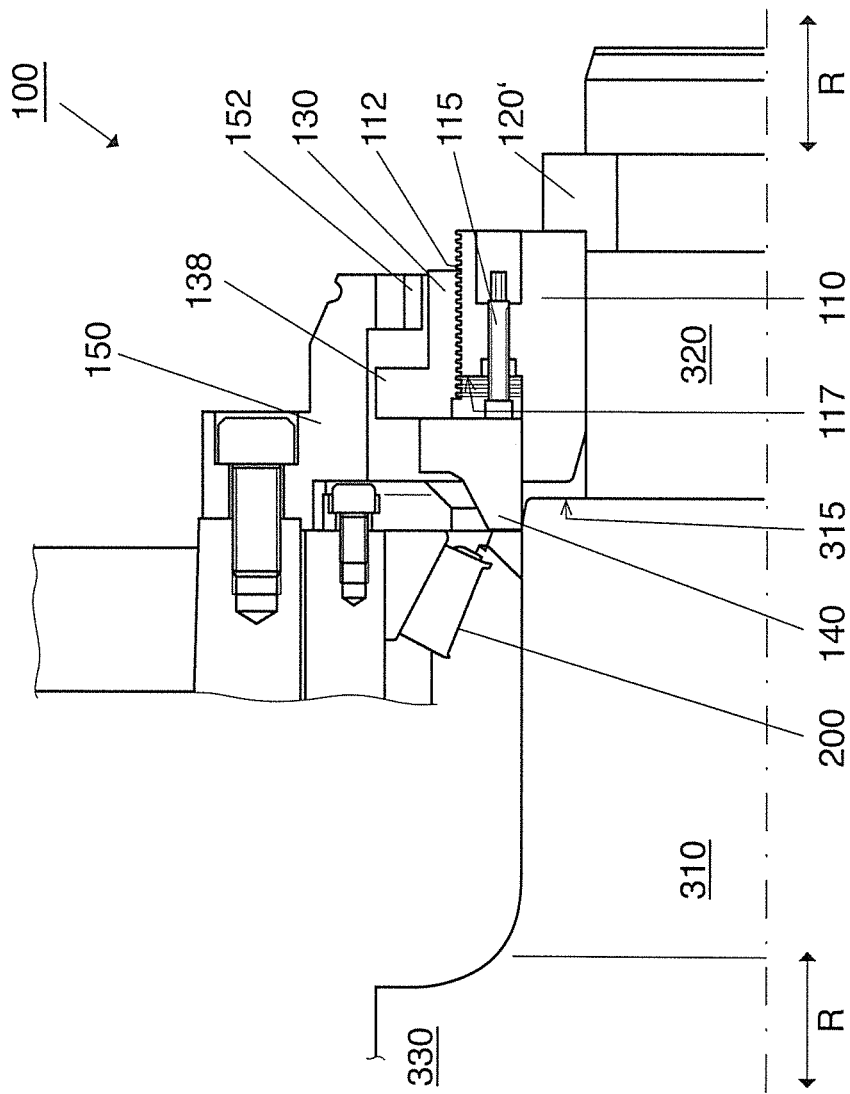
Figure 7:
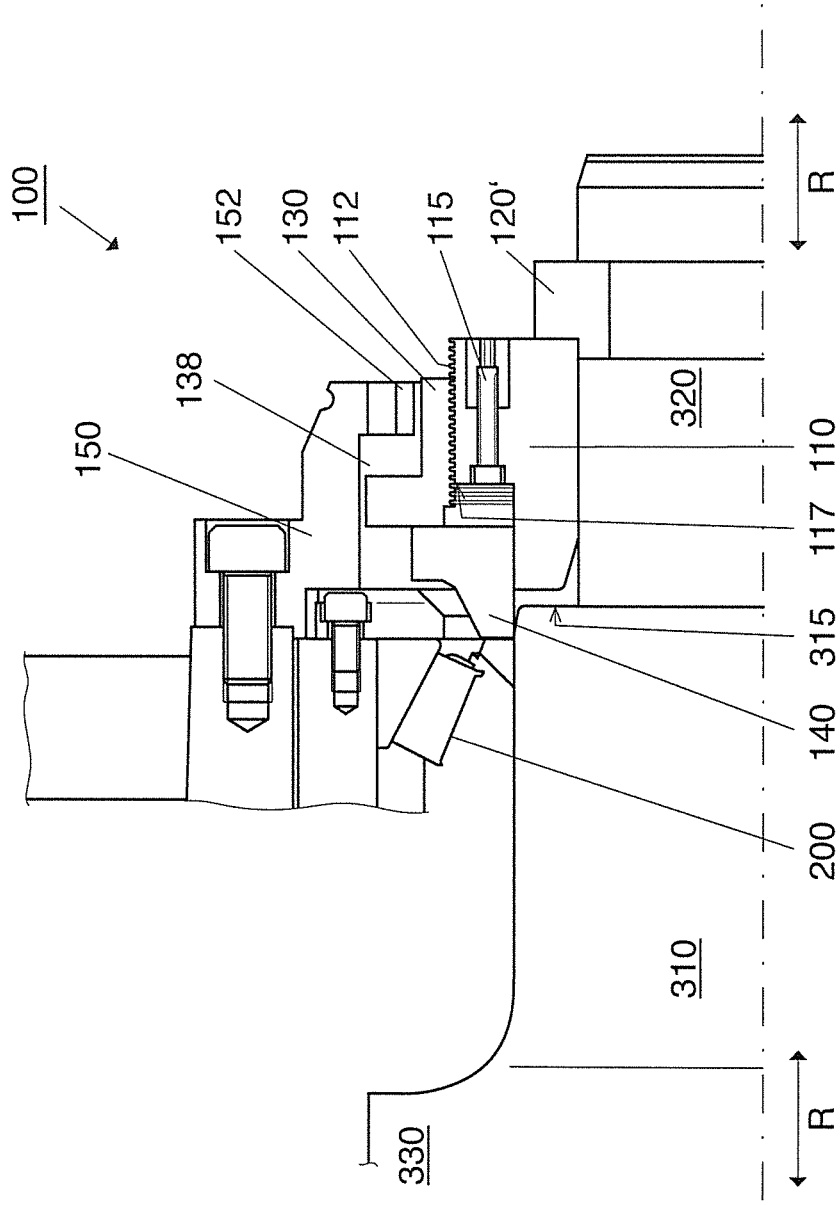

After the predetermined drawing force has been applied in the manner described, the ring nut 130 is turned against the pressure ring 140 and locked in such position in a positive-locking manner; see FIG. 6. The ring nut 130 thus takes the place of the screws and takes over the maintenance of the necessary drawing force for these, also during the later operation of the roller and the bearing. The first screws 115 can now be turned back and relieved from load in this manner, as shown in FIG. 7. The bearing 200 has thus been drawn on.

A method for releasing and/or drawing off the bearing from the roll journal comprises the following steps:

The starting configuration for the drawing-off process corresponds to the final configuration or the condition of the bearing closure device at the end of the drawing-on process, with the only difference that the second screws 135 are now also screwed into the bores in the flange 152 of the extension ring 150. Such second screws 135 are only relevant for the drawing-off process, but not for the drawing-on process.

Figure 8:
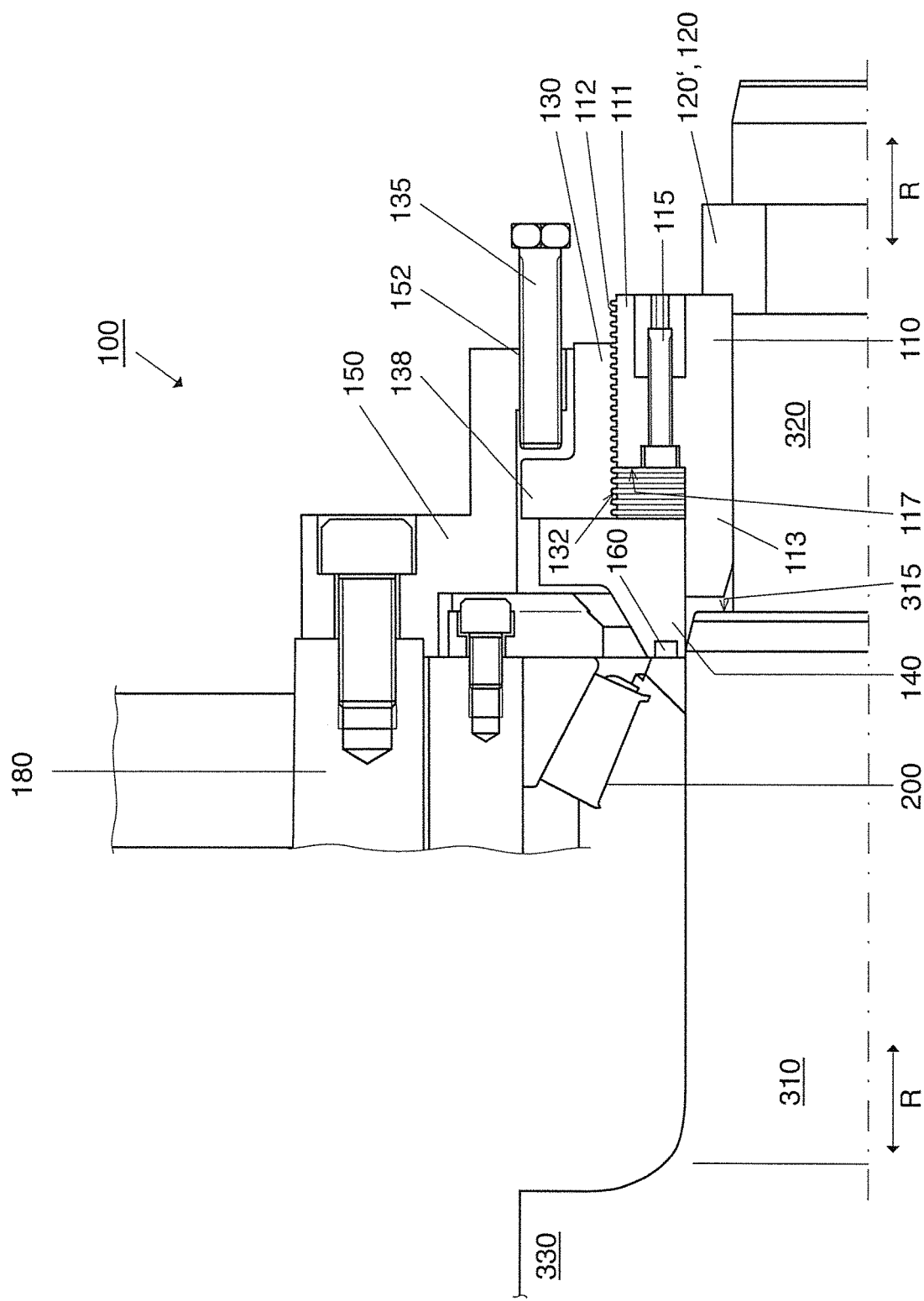
FIGS. 8-13 show the drawing off or releasing of the bearing from the roll journal.
Figure 9:
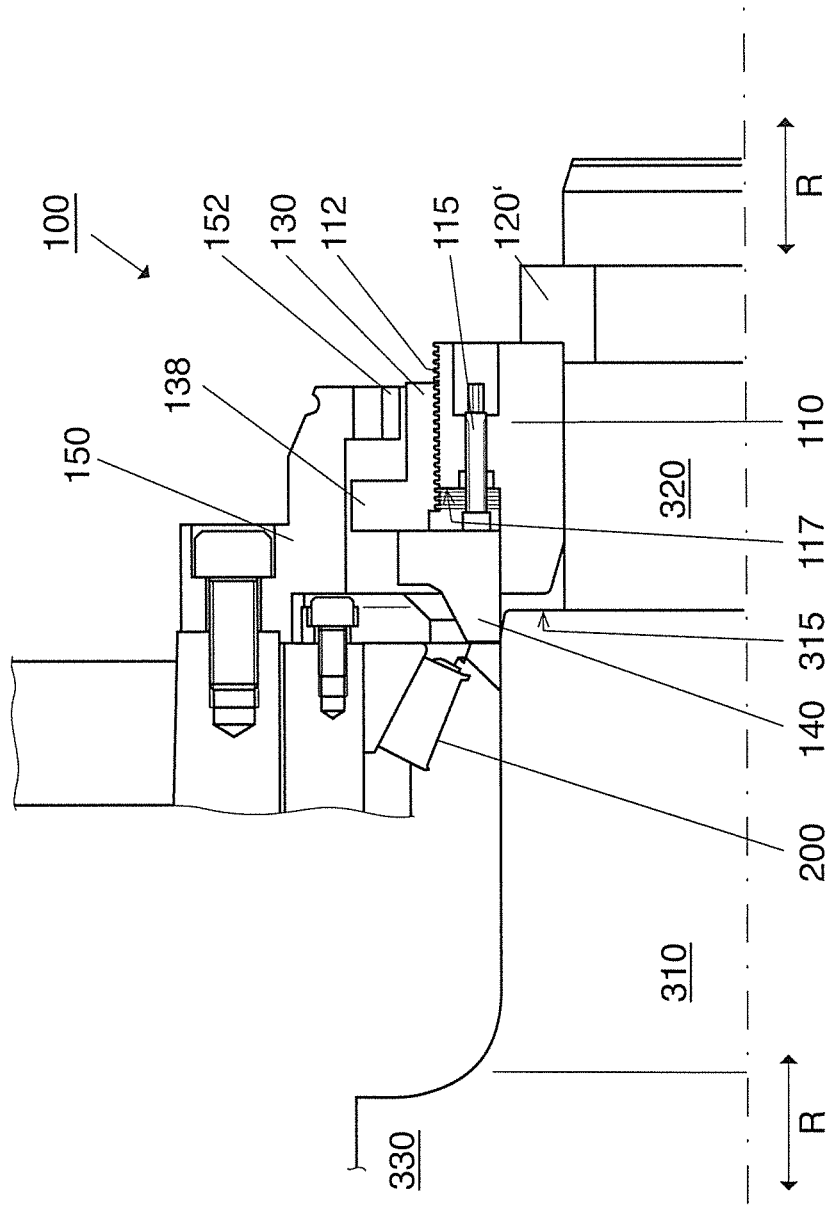
Figure 10:
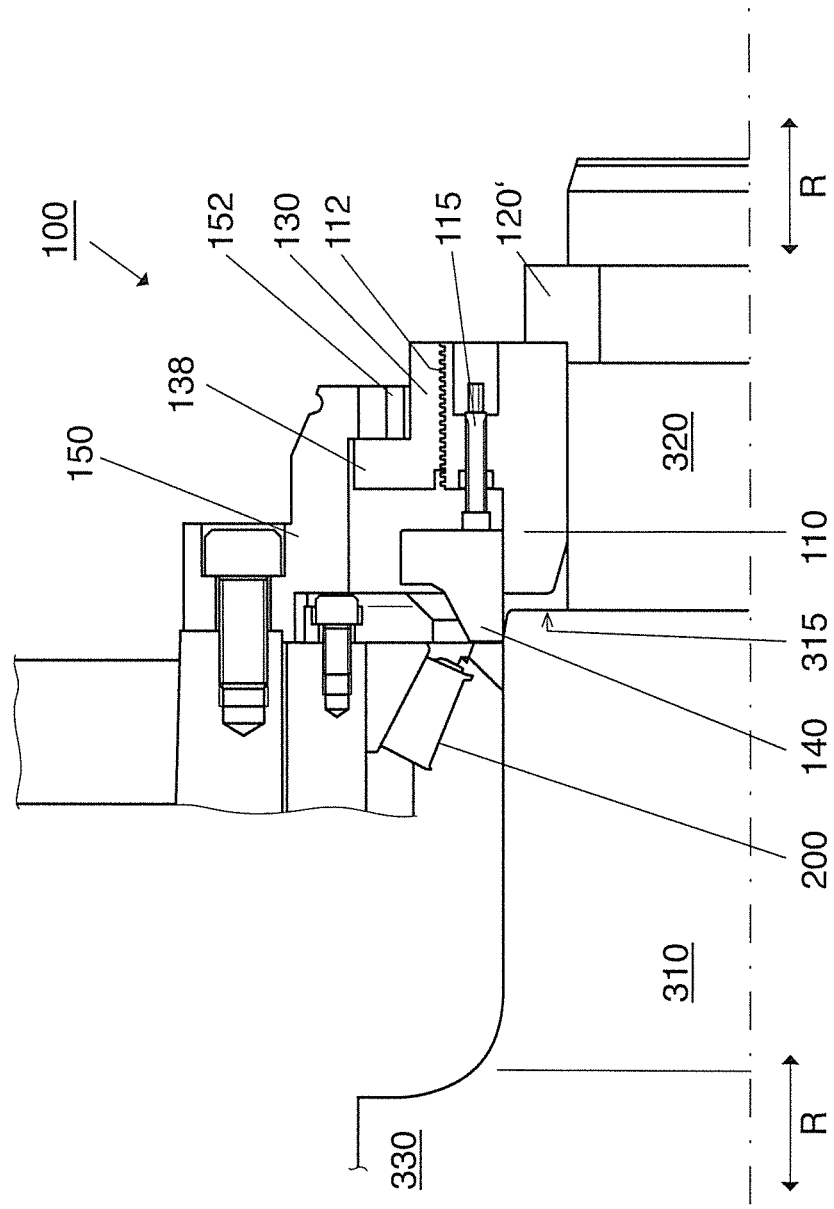
Figure 11:
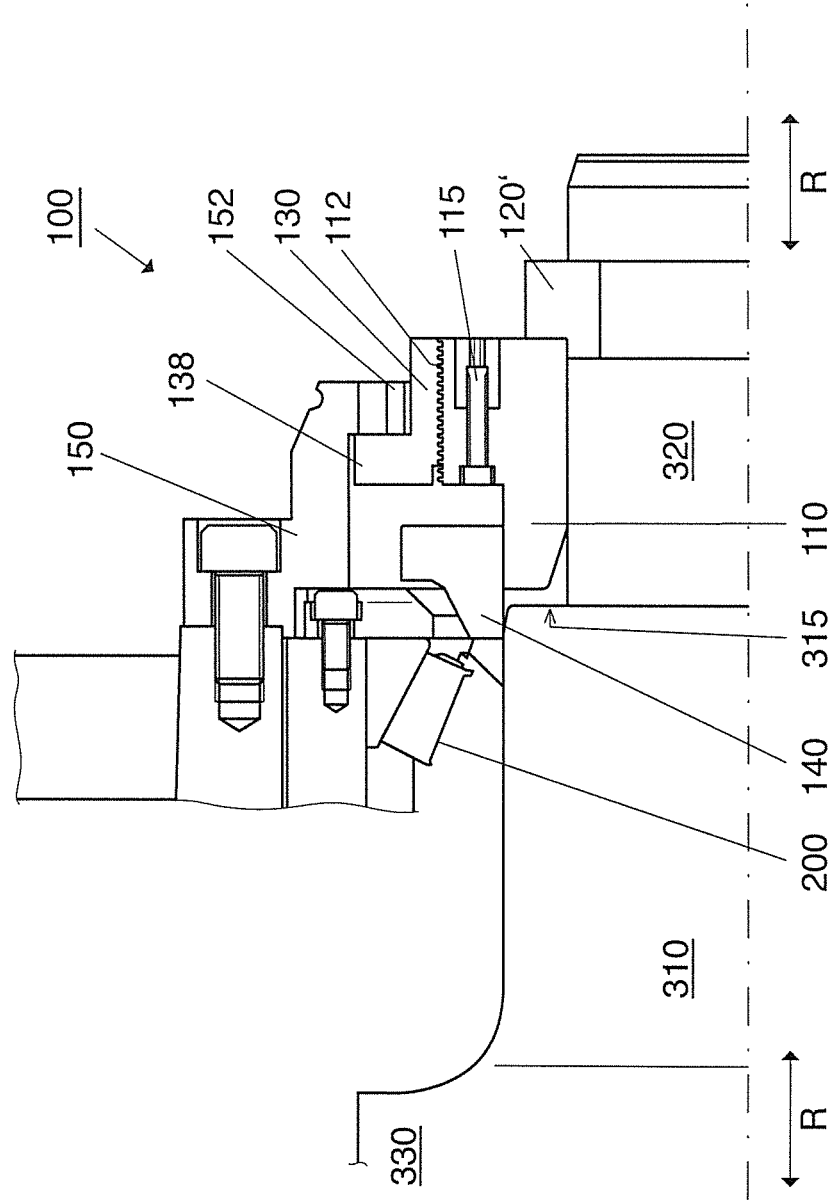

FIG. 8 shows the starting position for the drawing-off process. To prepare the drawing-off process, the tension between the pressure ring 140 and the ring nut 130 must first be released. For this purpose, the first screws 115 are tightened uniformly to a predetermined amount of torque, such that they press against the pressure ring 140 in the axial direction with a predetermined (drawing) force. Thereby, the first screws 115 are supported by the threaded ring 110 and the stop 120 on the roll journal. The pressure ring 140 then passes the drawing force applied by the first screws 115 to the bearing 200, causing the bearing to be drawn a little further onto the roll journal 310. This releases the ring nut 130, i.e. the previously existing axial tension on the pressure ring 140 is released in this manner; see FIG. 9. According to FIG. 10, the ring nut 130 is then unlocked and is turned back from its stop position in the axial direction away from the roll barrel 330. After the ring nut 130 has been turned back, the screws 115 can also be turned back away from the bearing; see FIG. 11.

Figure 12:
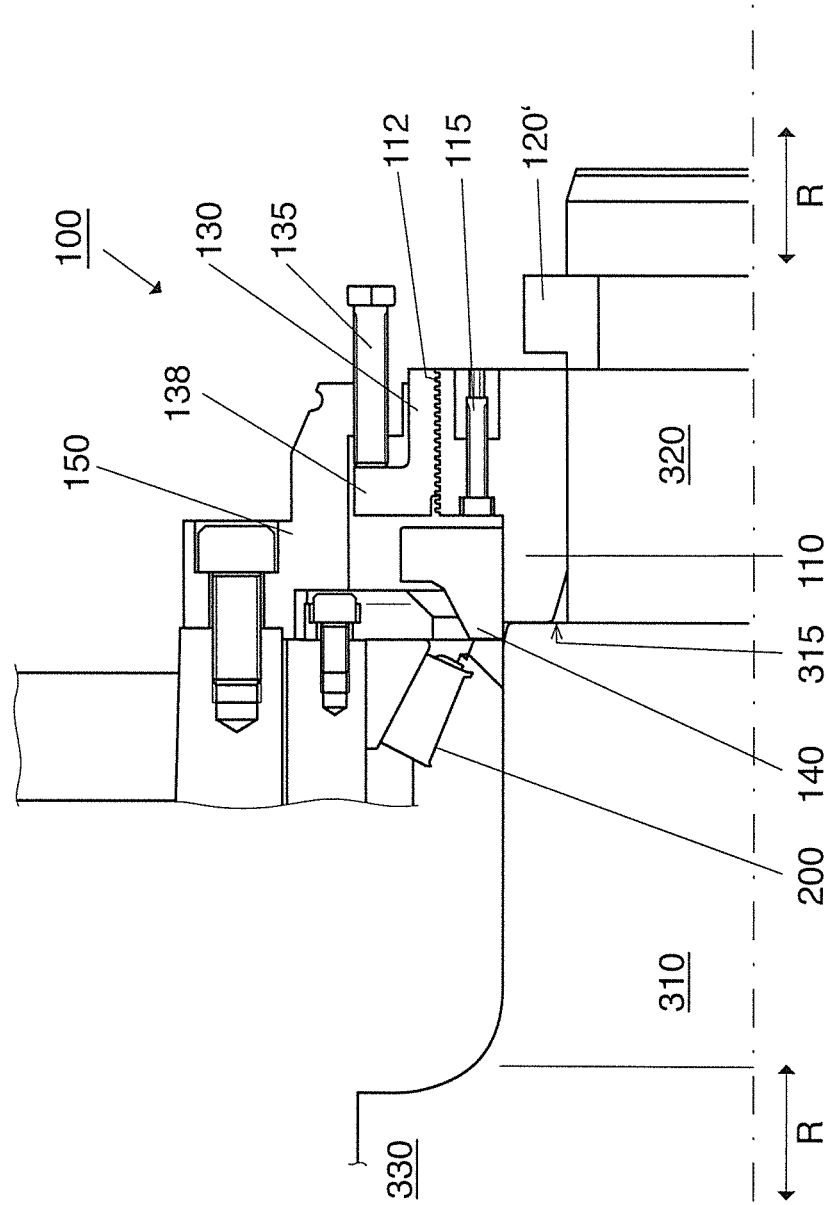
Figure 13:
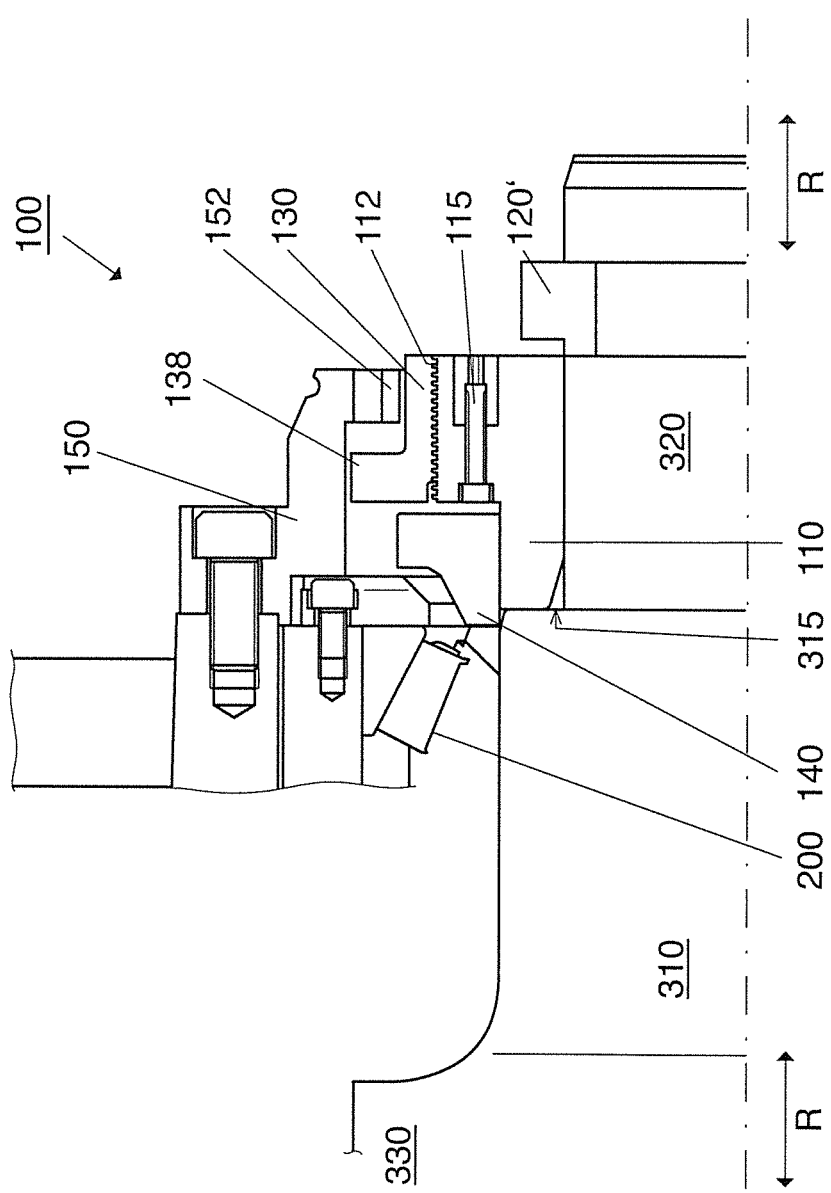

FIG. 12 shows that the second bolts 135 are now tightened against the flange 138 of the ring nut 130 in order to build up a force between the end cap and the ring nut to release and/or draw off the bearing from the roll journal. The force is built up because, with the first variant shown in FIG. 12 for the arrangement of the end cap ring nut constellation, the threaded ring 110, which engages with the ring nut 130 via its external thread 112, is displaced a little in the axial direction towards the roll barrel 330 or towards the bearing 200, and can be supported in the roll journal 310 at the stop 315 close to the roll barrel. Due to the positive-locking connection between the intermediate ring 150 and the bearing 200, this is released from the roll journal due to the force built up. The second screws 135 can now be removed, as shown in FIG. 13. The stop 120 is then removed and the bearing 200 can then be drawn off from the roll journal 310 together with the bearing closure device 100, for example with the assistance of a crane.

FIGS. 14 and 15 have already been mentioned in the text above.

Figure 16:
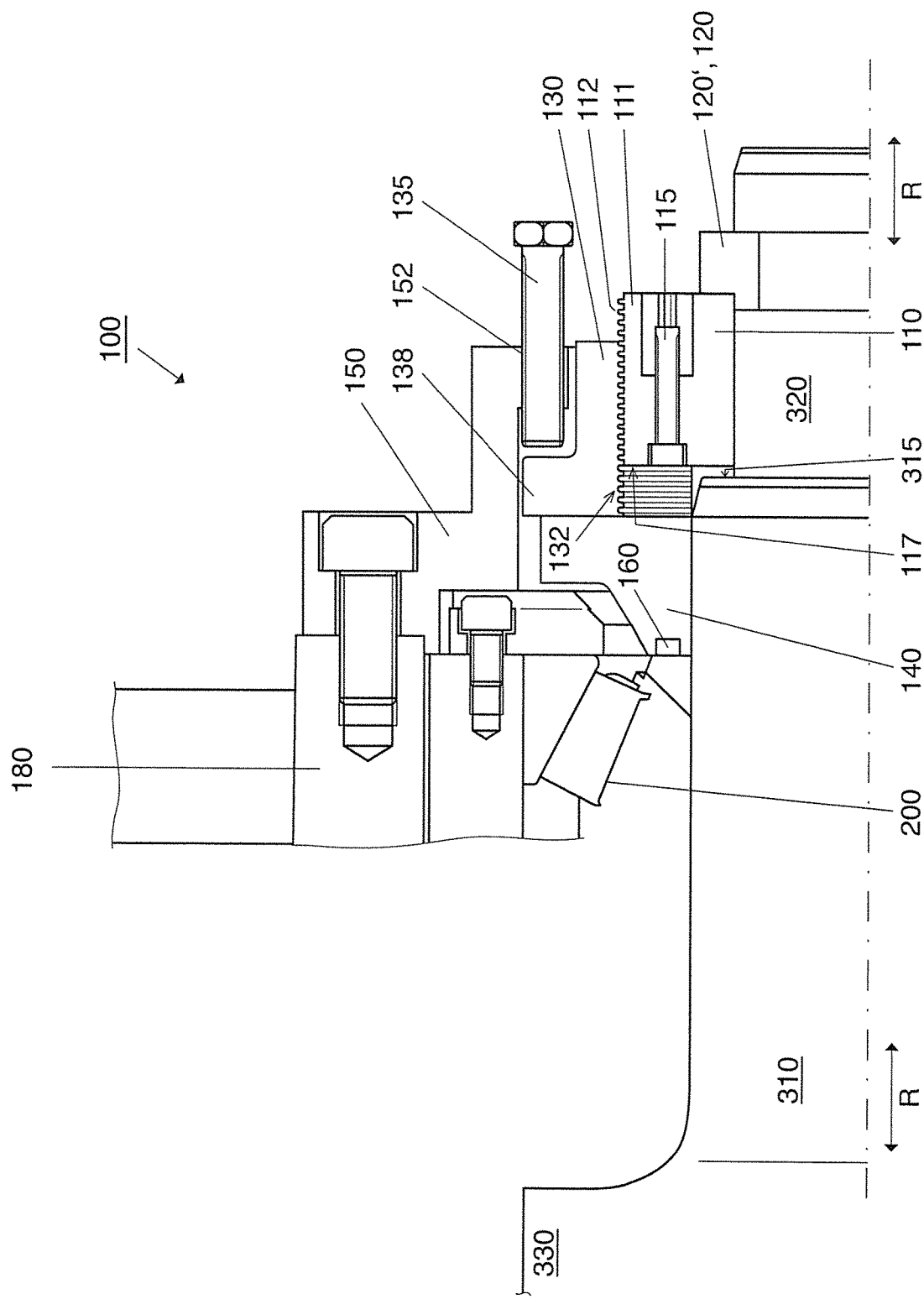
FIG. 16 shows a second exemplary embodiment of the roll journal threaded ring arrangement.

FIG. 16 shows a second exemplary embodiment of the design of the interaction of the roll journal and the threaded ring. In contrast to the first exemplary embodiment shown in FIG. 1, with the second exemplary embodiment now shown in FIG. 16, the roll journal 310 is formed to extend a little to the right, such that the pressure ring 140 is now completely mounted on the roll journal 310 in an axially displaceable manner. Furthermore, the second axial section 113 of the threaded ring 110 has been completely omitted, because it is no longer required as a bearing surface for the pressure ring 140 with this second embodiment; in this second embodiment without the second section 113, the threaded ring 110 is narrower than in FIG. 1 with the specified second section; rather, the threaded ring 110 now extends only over the width of the previous first section 111.

However, the threaded ring 110 can still be displaced axially between the stop 120 or 120' remote from the roll barrel and the stop 315 close to the roll barrel. If the ring nut 130 is not set against the pressure ring 140, as shown in FIG. 16, the pressure ring is mounted in an axially displaceable manner between the bearing 200 and the end face 117 of the threaded ring 110 close to the roll barrel.

Figure 17:
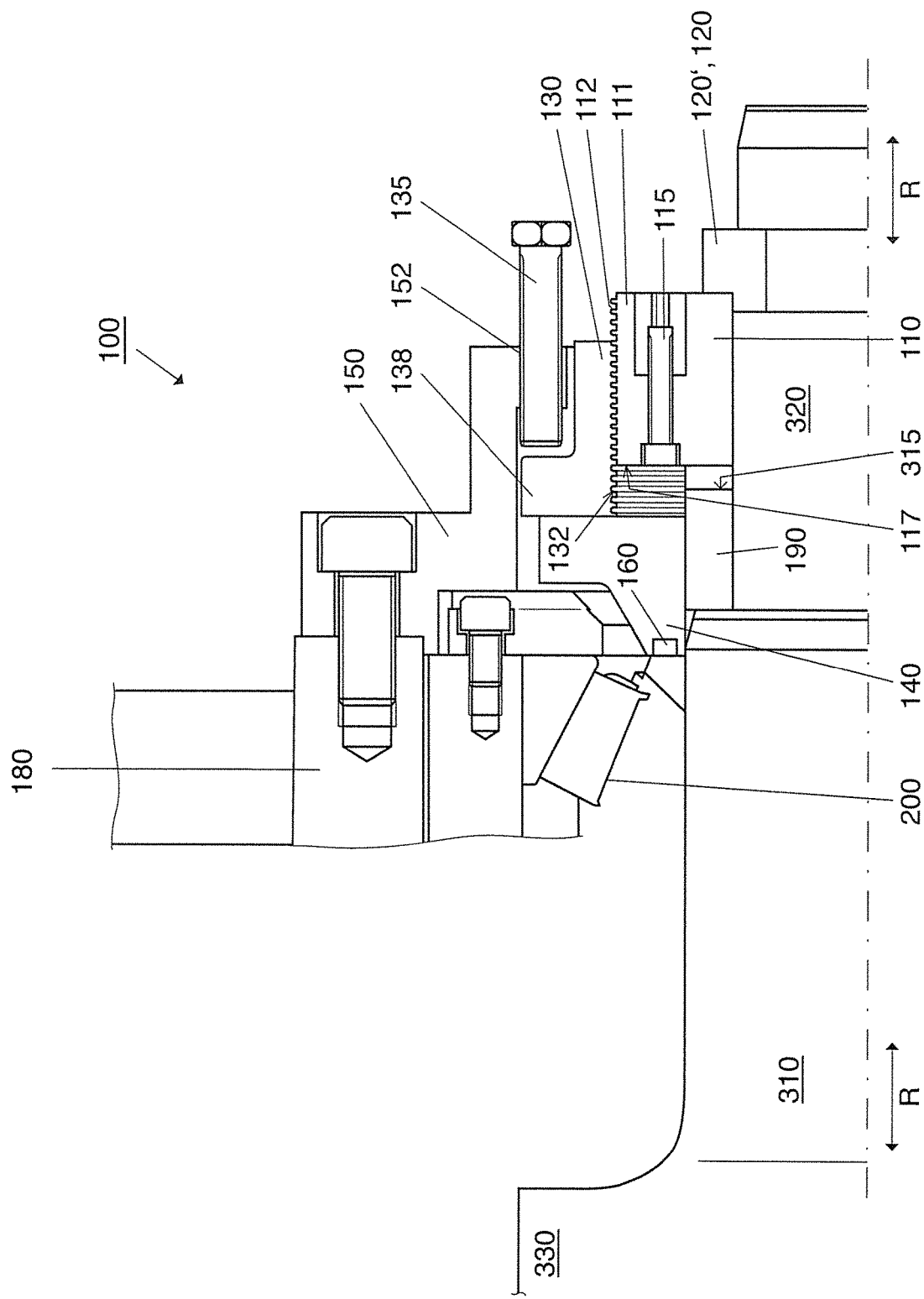
FIG. 17 shows a third exemplary embodiment of the roll journal threaded ring arrangement.

FIG. 17 shows a third variant for the arrangement of the roll journal in conjunction with the threaded ring. With this third arrangement, the extension of the roll journal 310 to the right is omitted according to FIG. 16; rather, it is formed to be similarly long or short as with the first exemplary embodiment according to FIG. 1. Nevertheless, the specified second section 113 of the threaded ring 110 is omitted here as well; i.e., the width of the threaded ring 110 is reduced to the original first axial section 111. As a replacement for the second axial section 113 of the threaded ring, with the third exemplary embodiment shown here, a filling ring 190 is now arranged or is mounted in an axially displaceable manner between the stop 315 close to the barrel for the threaded ring and the threaded ring 110 itself, or more precisely its end face 117 on the side of the roll barrel. With the exemplary embodiment shown in FIG. 17, the filling ring 190 serves as a carrier or support ring for the pressure ring 140. As such, with respect to its radial height, it is formed such that the pressure ring 140 can be displaced in an axially free manner; in particular, its radial height corresponds, for example, to the difference between the outer diameter of the roll journal 310 and the outer diameter of the roll shoulder 320. The end face of the filling ring 190 remote from the roll barrel now serves as a direct stop close to the roll barrel for the threaded ring 110, wherein, in the event of a stop, the filling ring 190 in turn is supported on the stop 315; in this respect, the stop 315 remains as an indirect stop for the threaded ring 110 even when the filling ring 190 is used.

Figure 18:
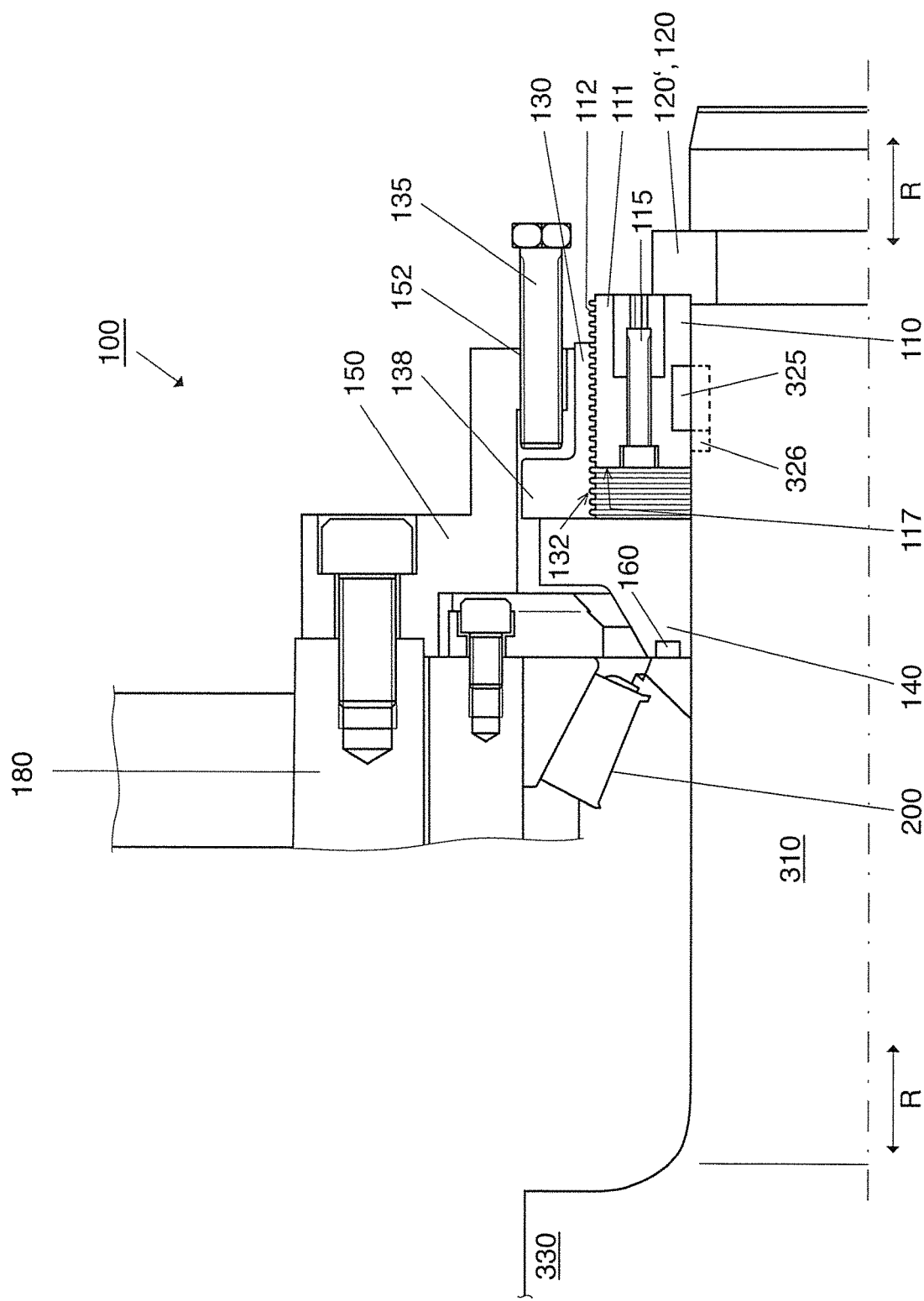
FIG. 18 shows a fourth exemplary embodiment of the roll journal threaded ring arrangement.
Figure 19:
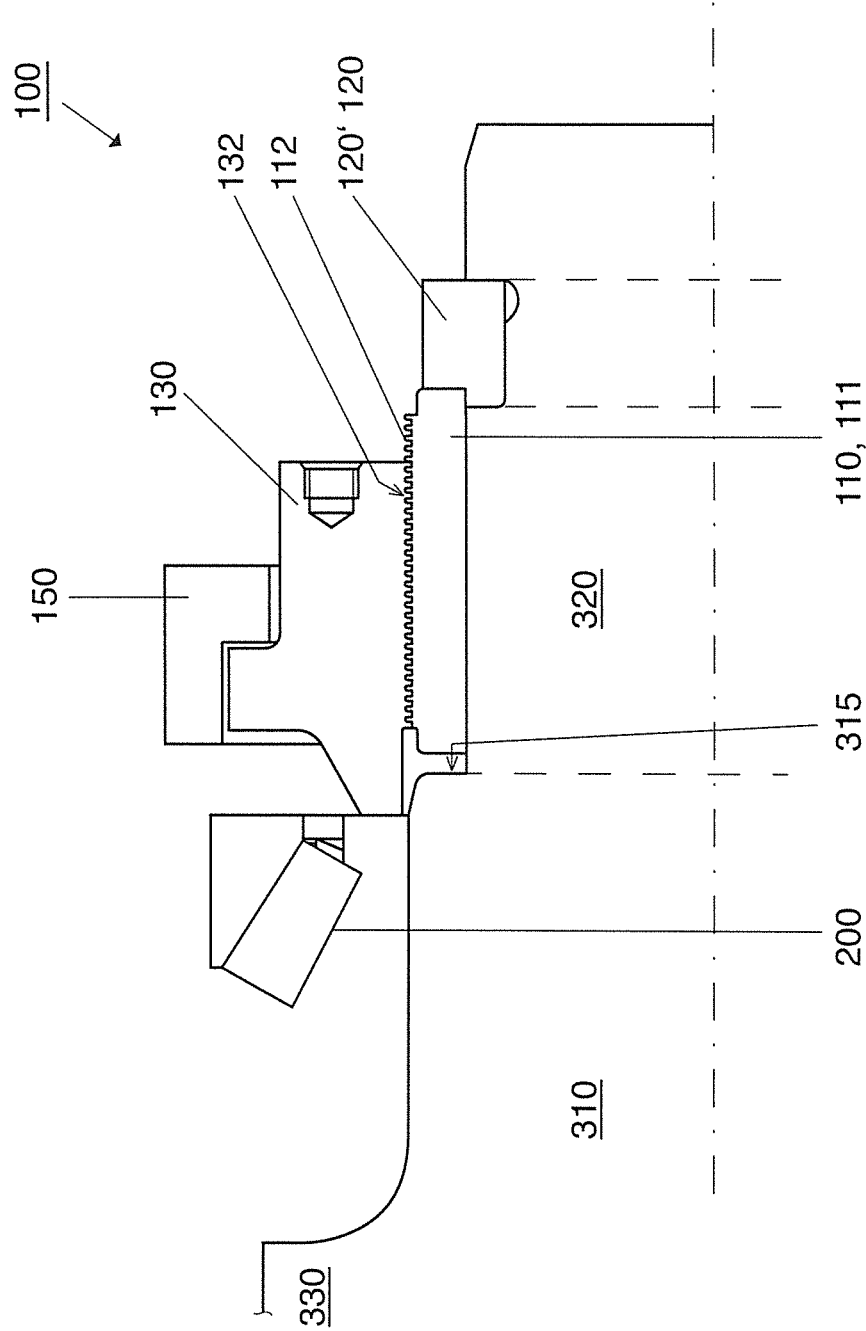
FIG. 19 shows a bearing closure device known from the prior art.

FIG. 18 shows a fourth exemplary embodiment of the design of the roll journal 310 with the threaded ring 110. The roll journal 310 is now formed with a uniform outer diameter throughout; a reduction of the outer diameter in the form of the roll shoulder 320 is now no longer necessary. With this fourth exemplary embodiment as well, the width of the threaded ring 110 is also limited to its first axial section 111; the axial extension 113 for carrying the pressure ring 140 is completely omitted, as is already the case with the exemplary embodiments 2 and 3 described above. Since the roll journal now has an essentially continuous outer diameter, with the fourth exemplary embodiment discussed here, the pressure ring 140 is again displaced onto the roll journal over its entire width. The same applies to the threaded ring 110. Both the pressure ring 140 and the threaded ring 110 are now mounted directly on the roll journal 310 in an axially displaceable manner. Since the pressure ring 140 is now mounted on the roll journal in a displaceable manner, there is no need to provide the filling ring 190 as a radial support for the pressure ring 140. As before, the stop 120, remote from the barrel, serves as the right-side limit for the movement of the threaded ring 110. A feather key 325 inserted into the threaded ring 110 serves as a stop close to the roll barrel, which feather key engages in a local axial groove 326 in the surface of the roll journal 310 and, if applicable, hits the limit of the groove 326 close to the barrel.

In all four exemplary embodiments in accordance with FIGS. 1, 16, 17 and 18 for the design of the interaction of the pressure body 140, the roll journal 310 and the threaded ring 110, the two methods according to the invention for drawing the bearing on the roll journal and for drawing off the bearing from the roll journal can be carried out equally or analogously with the assistance of the bearing closure device according to the invention. Particularly in the case of the omission of individual components mentioned in FIGS. 1 to 15, the omitted components are to be replaced by the replacement components written with reference to FIGS. 16 to 18; this applies in particular to the modified sliding surfaces for the pressure ring 140 and to the modified stops 117, 315.

LIST OF REFERENCE SIGNS

100 Bearing closure device
110 Threaded ring
111 First ring-shaped section of the threaded ring
112 External thread
113 Second ring-shaped section of the threaded ring
115 First screws
117 Stop for the pressure ring
120 Stop
120' Hinged ring
120" Bayonet lock
130 Ring nut
132 Internal thread
135 Second screws
138 Outer flange
140 Pressure ring
150 Intermediate ring
152 Inner flange of the intermediate ring
160 Pressure measuring cell
170 Additional ring
190 Filling ring
200 Bearing
310 Roll journal, in particular first ring-shaped section of the roll journal
315 Stop close to roll barrel in the roll journal
320 Roll shoulder (=second ring-shaped section of the roll journal)
325 Feather key
326 Axial groove
330 Roll barrels
R Axial direction

The invention claimed is:

1. A bearing closure device (100) for fastening at least one bearing (200) on a roll journal (310) of a roller having a roll barrel, the bearing (200) being configured to hold the roller in a roll stand, comprising:
   a threaded ring (110) configured to be mounted on the roll journal (310) in a slidable and axially displaceable manner, the threaded ring (110) having an external thread (112);
   a distal stop (120) for limiting axial movement of the threaded ring (110);
   a ring nut (130) with an internal thread (132) for screwing the ring nut (130) onto the external thread (112) of the threaded ring (110);
   a pressure ring (140) having an axially inner portion for securing a radially inner portion of the bearing and an axially outer portion facing the threaded ring (110), the pressure ring (140) being mounted in a displaceable manner in an axial direction (R) and configured to at least partially overlap in a radial direction with both the threaded ring (110) and with the ring nut (130); and
   a plurality of first screws (115) mounted rotatably in threaded axial bores that are circumferentially distributed in and extend through the threaded ring (110) in the area of radial overlap with the pressure ring, each of the first screws (115) having an axially inner end configured to abut the axially outer portion of the pressure ring (140) for pressing the pressure ring (140) in the axial direction (R),
   wherein the ring nut (130) can be screwed and adjusted in the axial direction against the pressure ring (140).

2. The bearing closure device (100) according to claim 1, further comprising:
   a ring-shaped intermediate ring (150); and
   second screws (135) that are directly or indirectly connected to the intermediate ring (150) and the ring nut (130) in order to build up an axial force between the intermediate ring (150) and the ring nut (130) for axially drawing off of the bearing (200).

3. The bearing closure device (100) according to claim 2, wherein the ring nut (130) has an outer flange (138) that projects radially outwardly, wherein the ring-shaped intermediate ring (150) has a radial inner area which comprises an axially and radially extending inner flange (152), which is formed to overlap the outer flange (138) of the ring nut (130) in such a manner that an end face of the outer flange (138) of the ring nut (130) is opposite an end face of the inner flange (152) of the intermediate ring (150), and wherein the second screws (135) can be screwed into axial threaded bores in the inner flange (152) of the intermediate ring (150) in order to build up the axial force between the intermediate ring (150) and the ring nut (130) by supporting the second screws (135) on the outer flange (138) of the ring nut (130).

4. The bearing closure device (100) as claimed in claim 2, wherein the ring nut (130) has an outer flange (138) that projects radially outwardly and which has a plurality of axially aligned bores distributed around its circumference,
   wherein the ring-shaped intermediate ring (150) with its radial inner area faces an end face close to the roll barrel of the outer flange (138) of the ring nut (130) and has, distributed at its radial inner area around its circumference, a plurality of axially aligned bores with internal threads, the bores in the intermediate ring (150) being aligned with the bores in the outer flange (138) of the ring nut (130),
   wherein the second screws (135) can be passed through the bores in the outer flange (138) of the ring nut (130) and can be screwed into the bores in the intermediate ring in order to build up the axial force between the intermediate ring (150) and the ring nut (130) for releasing the bearing (200) from the roll journal (310), and
   wherein the second screws (135) are supported with their screw heads against the outer flange (138).

5. The bearing closure device (100) according to claim 2, further comprising an additional ring (170) for axial mounting on an end face of the ring nut (130) remote from the roll barrel,
   wherein the additional ring (170) has a plurality of axially aligned bores distributed around its periphery, which bores are formed radially outside the ring nut (130),
   wherein the ring-shaped intermediate ring (150) with its radial inner area faces an end face close to the roll barrel of a periphery of the additional ring (170) and has, distributed at its radial inner area around its circumference, a plurality of axially aligned bores with internal threads,
   wherein the bores in an end cover are aligned with the bores in the additional ring (170),
   wherein the second screws (135) can be passed through the bores in the additional ring and can be screwed into the bores in the end cover in order to build up the axial force between the intermediate ring (150), the ring nut (130) and the additional ring (170) for releasing the bearing (200) from the roll journal (310), and
   wherein the second screws (135) are supported with their screw heads on the additional ring (170).

6. The bearing closure device (100) according to claim 1, wherein the distal stop (120) for the threaded ring (110) remote from the roll barrel is formed by a hinged ring (120') which is adapted to be inserted in an axially fixed manner into a circumferential groove in the roll journal (310).

7. The bearing closure device (100) according to claim 1, wherein the distal stop (120) for the threaded ring (110) is formed by a bayonet lock (120") which is adapted to be axially fixed in the axial direction (R) on the roll journal (320).

8. An assembly, comprising the bearing closure device (100) and the roller according to claim 1, wherein the roll journal (310) is formed at an end remote from the roll barrel in the shape of a roll shoulder (320) with reduced diameter, wherein the threaded ring (110) is mounted in an axially displaceable manner on the roll shoulder (320) and the distal stop (120) remote from the roll barrel for the threaded ring (110) is axially fixed on the roll shoulder (320), and wherein a proximal stop (315) close to the roll barrel for the threaded ring is formed by a shoulder in the roll journal in a transition area to the roll shoulder.

9. The assembly according to claim 8,
   wherein a filling ring (190) is mounted in a displaceable manner on the roll journal between the proximal stop (315) in the roll journal and the threaded ring (110), and
   wherein a radial height of the filling ring corresponds to the difference between a diameter of the roll journal and a diameter of the roll shoulder.

10. The assembly according to claim 9,
    wherein the pressure ring (140) is mounted in an axially displaceable manner at least partially on at least one of the roll journal, the filling ring (190), or the threaded ring (110).

11. The bearing closure device (100) according to claim 1,
wherein a longitudinal section of the threaded ring (110) with the external thread (112) represents a first ring-shaped section (111) extending in the axial direction, of the threaded ring,
wherein the threaded ring (110) has an extension at its end facing the bearing (200), which represents a second ring-shaped section (113) of the threaded ring (110) extending in the axial direction, and
wherein the pressure ring (140) is mounted on the second ring-shaped section (113) of the threaded ring (110) in a displaceable manner in the axial direction.

12. The bearing closure device (100) according to claim 11,
wherein the second ring-shaped section (113) is formed with a smaller diameter than the first ring-shaped section (111), by which, between the first and second sections (113), a shoulder is formed in the threaded ring (110) as a stop (117) remote from the roll barrel for the pressure ring (140).

13. The bearing closure device (100) according to claim 1,
wherein the pressure ring (140) includes a pressure measuring cell (160) to record a drawing force that is applied to the pressure ring.

14. The bearing closure device (100) as in claim 1,
wherein, the plurality of first screws (115) overlap in an axial direction with the threaded ring (110) along their entire extension.

* * * * *